(12) United States Patent
Heo et al.

(10) Patent No.: US 12,258,070 B2
(45) Date of Patent: Mar. 25, 2025

(54) ROOF BODY STRUCTURE FOR VEHICLE

(71) Applicants: Hyundai Motor Company, Seoul (KR); Kia Corporation, Seoul (KR)

(72) Inventors: Chulhee Heo, Hwaseong-si (KR); Youngrock Kim, Gwangmyeong-si (KR); ChangHak Kang, Hwaseong-si (KR); Chan Woong Jeon, Incheon (KR); Taegyu Park, Hwaseong-si (KR); HaeHoon Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 281 days.

(21) Appl. No.: 17/956,053

(22) Filed: Sep. 29, 2022

(65) Prior Publication Data
US 2023/0356783 A1 Nov. 9, 2023

(30) Foreign Application Priority Data
May 4, 2022 (KR) .................. 10-2022-0055199

(51) Int. Cl.
*B62D 25/04* (2006.01)
*B62D 25/06* (2006.01)

(52) U.S. Cl.
CPC ............. *B62D 25/06* (2013.01); *B62D 25/04* (2013.01)

(58) Field of Classification Search
CPC .. B62D 25/04; B62D 25/06; B60J 1/00; B60J 1/007
USPC .................................. 296/210, 215
See application file for complete search history.

(56) References Cited

U.S. PATENT DOCUMENTS

| 6,793,277 B2 * | 9/2004 | Chon ................ B32B 17/10174 296/211 |
| 7,568,287 B2 * | 8/2009 | Wieschermann ...... B62D 25/06 29/897.2 |
| 8,256,832 B2 * | 9/2012 | Adamski .................. B60J 7/022 296/216.08 |

FOREIGN PATENT DOCUMENTS

DE 102016222116 A1 * 5/2018

OTHER PUBLICATIONS

DE102016222116 (Year: 2018).*

* cited by examiner

*Primary Examiner* — Dennis H Pedder
(74) *Attorney, Agent, or Firm* — Slater Matsil, LLP

(57) ABSTRACT

An embodiment vehicle roof structure mountable on side structures respectively provided at both sides of a vehicle body along a vehicle width direction, the vehicle roof structure includes a ring reinforcement member disposed between the side structures and a plurality of main roof rail members connected to the ring reinforcement member and connected to respective front pillars and rear pillars of the side structures.

19 Claims, 7 Drawing Sheets

ROOF BODY STRUCTURE FOR VEHICLE

CROSS-REFERENCE TO RELATED APPLICATIONS

This application claims the benefit of Korean Patent Application No. 10-2022-0055199, filed on May 4, 2022, which application is hereby incorporated herein by reference.

TECHNICAL FIELD

An embodiment of the present invention relates to a vehicle body of a vehicle.

BACKGROUND

Recently, the vehicle industry has been introducing a new concept of future mobility vision for realizing a human-centered and dynamic future city. One of these future mobility solutions is a purpose built vehicle (PBV) as a purpose-based mobility.

An example of the PBV may be an electric vehicle (EV)-based environmentally friendly mobile vehicle. Such a PBV may set an optimal route for each situation by using artificial intelligence and unmanned autonomous driving, and may also conduct platoon driving.

Meanwhile, the PBV may provide various customized services to users during a time it takes to travel on the ground to a destination in an unmanned autonomous driving method. For this purpose, the PBV is manufactured in a one box design with a large interior space.

Furthermore, in the PBV, glass may be applied to a roof structure of a vehicle body in order to provide a user with an open feeling of the interior. Those skilled in the art also refer to the glass as 'courtyard roof glass' or 'sunroof glass'. Hereinafter, it is referred to as 'roof glass' for convenience.

The roof structure of the PBV is provided with a ring reinforcement member and a lateral roof rail so that the roof glass may be installed. Here, the roof structure requires a ring reinforcement member capable of installing a large-area roof glass in order to provide a user with a sense of openness of a large interior space in a vehicle of a one-box design.

The ring reinforcement member having a size corresponding to the large-area roof glass described above may be connected to both side structures (for example, roof sides) of the vehicle body. Therefore, the PBV according to the prior art does not secure overall rigidity of the vehicle body because an installation space for installing the lateral roof rail is insufficient.

The above information disclosed in this background section is only for enhancement of understanding of the background of embodiments of the invention, and therefore it may contain information that does not form the prior art that is already known to a person of ordinary skill in the art.

SUMMARY

An embodiment of the present invention relates to a vehicle body of a vehicle. Particular embodiments relate to a roof structure of a vehicle body for a PBV.

Embodiments of the present invention provide a vehicle roof structure that may secure overall rigidity of a vehicle body when a large-area roof glass is installed.

An embodiment of the present invention provides a vehicle roof structure that is mounted on side structures respectively provided at both sides along a vehicle width direction of a vehicle body, including: i) a ring reinforcement member disposed between the side structures at both sides; and ii) a plurality of main roof rail members connected to the ring reinforcement member and to respective front pillars and rear pillars of the side structures at both sides.

The plurality of main roof rail members may be connected to respective corner portions of the ring reinforcement member on an extension line of respective front pillars and rear pillars of the side structures at both sides.

The plurality of main roof rail members may radially connect respective corner portions of the ring reinforcement member and respective front pillars and rear pillars of the side structures at both sides.

The vehicle roof structure may further include a plurality of sub-roof rail members connected to the side structures at both sides and the ring reinforcement member along the vehicle width direction.

The plurality of sub-roof rail members may be connected to respective roof sides of the side structures at both sides and to both side portions along the vehicle width direction of the ring reinforcement member, in the vehicle width direction.

The plurality of sub-roof rail members may be connected to at least one door supporting pillar respectively provided in the side structures at both sides, and to both side portions along the vehicle width direction of the ring reinforcement member, in the vehicle width direction.

The vehicle roof structure may further include a front roof rail and a rear roof rail connected in the vehicle width direction to upper portions of respective front pillars and rear pillars of the side structures at both sides.

The plurality of main roof rail members may be connected to respective corner portions of the ring reinforcement member and both end portions of each front roof rail and each rear roof rail.

The plurality of main roof rail members may include a first bonding end portion bonded to pillar bonding end portions of each front roof rail and each rear roof rail, and a second bonding end portion bonded to respective corner portions of the ring reinforcement member.

According to the embodiments of the present invention, it is possible to secure overall connection rigidity and frame rigidity of a vehicle body configured in a one-box design.

In addition, effects that may be obtained or expected from embodiments of the present invention are directly or suggestively described in the following detailed description. That is, various effects expected from embodiments of the present invention will be described in the following detailed description.

BRIEF DESCRIPTION OF THE DRAWINGS

These drawings are for reference only in describing embodiments of the present invention, and therefore, the technical idea of the present invention should not be limited to the accompanying drawings.

Figure 1:
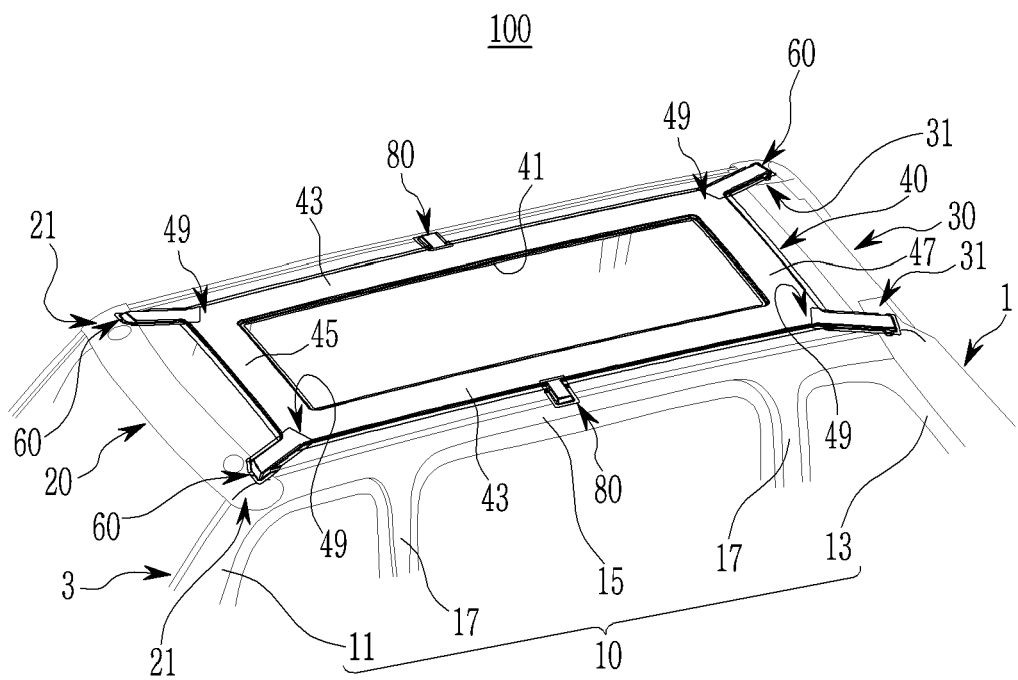
FIG. 1 illustrates a combined perspective view of a vehicle roof structure according to an embodiment of the present invention.

It should be understood that the above-referenced drawings are not necessarily to scale, presenting a somewhat simplified representation of various preferred features illustrative of the basic principles of embodiments of the invention. The specific design features of embodiments of the present invention, including, for example, specific dimensions, orientations, locations, and shapes, will be determined in part by the particular intended application and use environment.

The following reference identifiers may be used in connection with the accompanying drawings to describe exemplary embodiments of the present disclosure.

| | |
|---|---|
| 1: vehicle body | 3: upper body |
| 10: both side structures | 11: front pillar |
| 13: rear pillar | 15: roof side |
| 17: door supporting pillar | 20: front roof rail |
| 21, 31: pillar bonding end portion | 30: rear roof rail |
| 40: ring reinforcement member | 41: glass mounting hole |
| 43: both side portions | 45: front portion |
| 47: rear portion | 49: corner portion |
| 60: main roof rail member | 61: first bonding end portion |
| 62: second bonding end portion | 80, 180: sub-roof rail member |
| 100, 200: vehicle roof structure | |

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another by welding, self-piercing rivets (SPR), flow drill screws (FDS), a structural adhesive, and the like or indirectly connected via one or more intermediary components.

It is understood that the term "vehicle," "vehicular," "car," or other similar term as used herein is inclusive of motor vehicles, in general, such as passenger automobiles including sport utility vehicles (SUVs), buses, trucks, various commercial vehicles, watercraft including a variety of boats and ships, aircraft, and the like, and includes hybrid vehicles, electric vehicles, hybrid electric vehicles, electric vehicle-based purpose built vehicles (PBVs), hydrogen-powered vehicles, and other alternative fuel vehicles (for example, fuels derived from resources other than petroleum).

Hereinafter, embodiments of the present invention will be described in detail with reference to the accompanying drawings.

Figure 2:
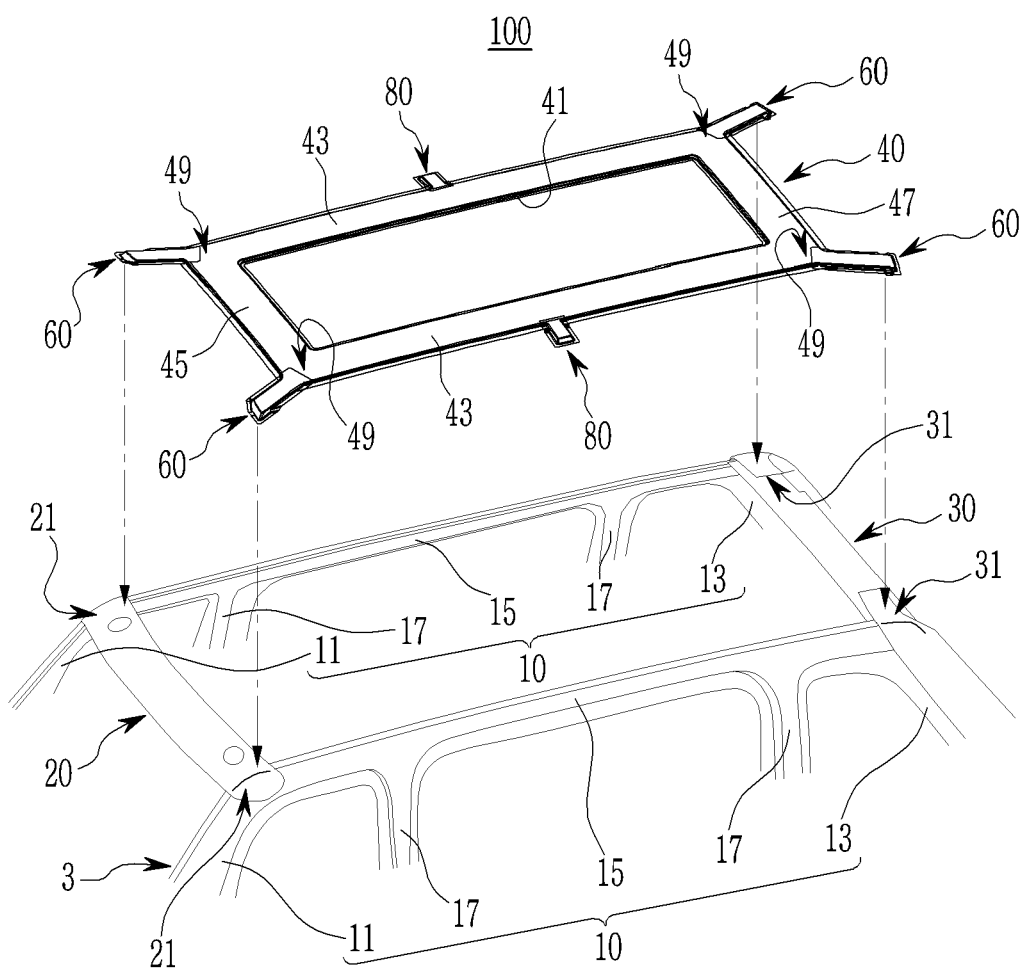
FIG. 2 illustrates an exploded perspective view of a vehicle roof structure according to an embodiment of the present invention.
Figure 3:
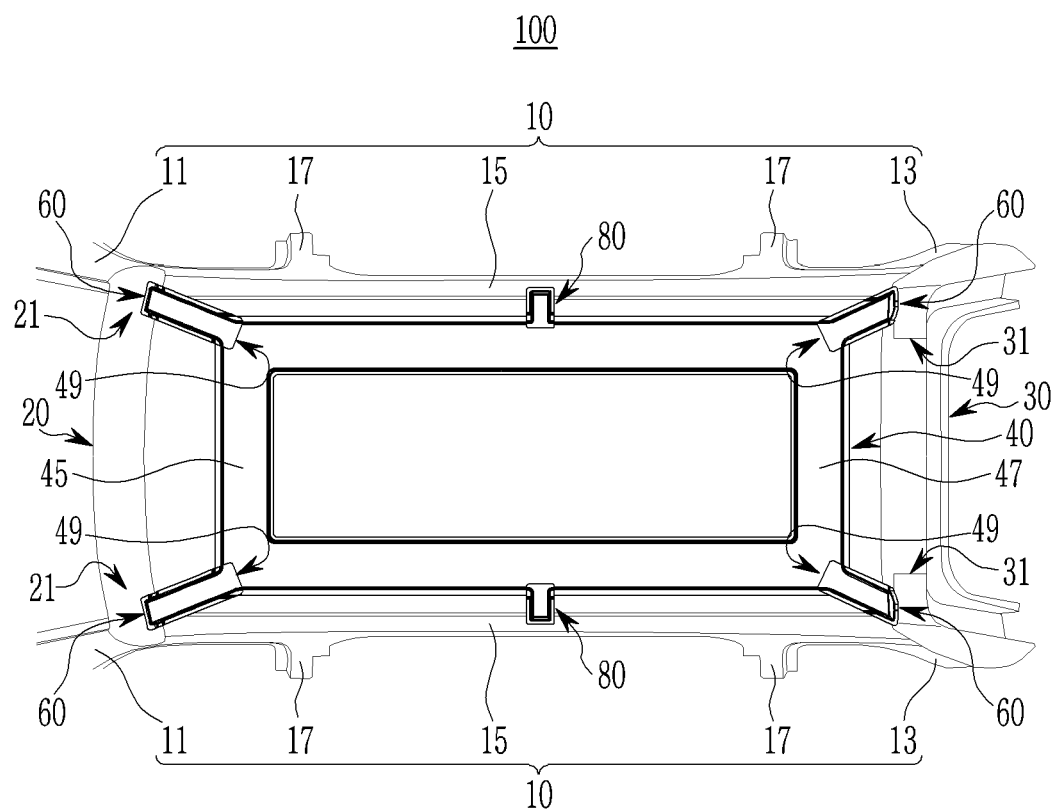
FIG. 3 illustrates a plan schematic diagram of a vehicle roof structure according to an embodiment of the present invention.

FIG. 1 illustrates a combined perspective view of a vehicle roof structure according to an embodiment of the present invention, FIG. 2 illustrates an exploded perspective view of a vehicle roof structure according to an embodiment of the present invention, and FIG. 3 illustrates a plan schematic diagram of a vehicle roof structure according to an embodiment of the present invention.

Referring to FIG. 1 to FIG. 3, a vehicle roof structure 100 according to an embodiment of the present invention may be applied to, for example, a vehicle body 1 of a purpose built vehicle (hereinafter referred to as a 'PBV').

Here, the PBV may be an electric vehicle-based environmentally friendly vehicle that provides a customized service required for an occupant during a time it takes to travel on the ground to a destination.

In one example, the PBV may be utilized as a life module vehicle that provides various customized services to users during a time of moving on the ground to a destination in an unmanned autonomous driving method. Such a life module vehicle is generally referred to as a 'robo-taxi', 'robo-shuttle', or 'hailing vehicle' by those skilled in the art.

The PBV may be manufactured in a one box design with a large interior space. In addition, the PBV may apply a facing type seat to provide a spacious interior space.

The vehicle body 1 of the PBV includes a skateboard-type of underbody (not shown) (it is also generally referred to as a 'rolling chassis' or 'chassis frame' by those skilled in the art) and an upper body 3 assembled to the underbody.

A battery assembly (not shown) and a driving motor may be mounted on the underbody. In addition, the upper body 3 is a body-in-white (BIW) body coupled to the underbody, and may configure a cabin with a large interior space.

In the present specification, reference directions for describing the following constituent elements may be set, in one example, in a vehicle body front-rear direction (for example, a vehicle body length direction or longitudinal direction), a vehicle width direction (for example, a lateral direction), and a vertical direction (for example, a height direction).

In addition, in the present specification, an 'upper end portion', 'upper portion', 'upper end', or 'upper surface' of a constituent element represents an end portion, a portion, an end, or a surface of the constituent element that is relatively upper in the drawing, and a 'lower end portion', a 'lower portion', a 'lower end', or a 'lower surface' of a constituent element represents an end portion, a portion, an end, or a surface of the constituent element that is relatively lower in the drawing.

In addition, in the present specification, an end of a constituent element (for example, one end, the other end, both ends, or the like) represents an end of the constituent element in any one direction, and an end portion of a constituent element (for example, one end portion, the other end portion, both end portions, or the like) represents a portion of the constituent element including the end.

On the other hand, the upper body 3 as described above includes side structures 10 (hereinafter, referred to as 'both side structures' for convenience) provided at both sides in a vehicle width direction, respectively, and the roof structure 100 for a vehicle according to an embodiment of the present invention.

Each of the both side structures 10 includes a front pillar 11, a rear pillar 13, a roof side 15, and at least one door supporting pillar 17.

The front pillar 11 and the rear pillar 13 are provided as pillars having relatively high rigidity in the vehicle body 1. The roof side 15 is connected to upper portions of the front pillar 11 and the rear pillar 13 along the front-rear direction of the vehicle body. In addition, the at least one door supporting pillar 17 is configured to support, in one example, a sliding door, and is connected to the roof side 15 along the vertical direction.

The vehicle roof structure 100 according to an embodiment of the present invention is mounted on upper portions of the both side structures 10. The vehicle roof structure 100 may include a large-area roof glass (not shown) for providing a user with a sense of openness of the interior of the PBV.

As described above, the vehicle roof structure 100 according to an embodiment of the present invention has a structure capable of securing the overall rigidity of the vehicle body 1 when a large-area roof glass is mounted.

To this end, the vehicle roof structure 100 according to an embodiment of the present invention includes a front roof rail 20, a rear roof rail 30, a ring reinforcement member 40, a plurality of main roof rail members 60, and a plurality of sub-roof rail members 80.

In the embodiment of the present invention, the front roof rail 20 is connected to an upper portion of the front pillar 11 of each of the both side structures 10 in the vehicle width direction.

In an embodiment of the present invention, the rear roof rail 30 is connected to an upper portion of the rear pillar 13 of each of the both side structures 10 in the vehicle width direction.

Here, the front roof rail 20 and the rear roof rail 30 may be coupled (for example, welded) to a roof panel (not shown) connected to the roof side 15.

In an embodiment of the present invention, the ring reinforcement member 40 is configured to mount a large-area roof glass (not shown) to the vehicle roof structure 100.

The ring reinforcement member 40 may be coupled (for example, welded) to roof panels (not shown) connected to the roof sides 15 of the both side structures 10. The ring reinforcement member 40 is disposed between the both side structures 10 and between the front roof rail 20 and the rear roof rail 30.

In one example, the ring reinforcement member 40 may be provided as a member having a quadrangular shape in which a glass mounting hole 41 is formed. The ring reinforcement member 40 includes both side portions 43, a front portion 45, a rear portion 47, and a plurality of corner portions 49.

The both side portions 43 are provided at both sides of the ring reinforcement member 40 along the vehicle width direction, respectively, and are disposed along the front-rear direction of the vehicle body. The front portion 45 is connected to front side ends of the both side portions 43 in the vehicle width direction. The rear portion 47 is connected to rear side ends of the both side portions 43 in the vehicle width direction. In addition, the plurality of corner portions 49 are respectively formed at connection portions of the side portions 43, the front portion 45, and the rear portion 47.

In an embodiment of the present invention, the plurality of main roof rail members 60 are configured to connect the both side structures 10 and the ring reinforcement member 40.

Furthermore, the plurality of main roof rail members 60 according to an embodiment of the present invention are configured to transmit a load applied to the both side structures 10 through the front pillar 11 and the rear pillar 13 to the ring reinforcement member 40.

Each of the plurality of main roof rail members 60 may be provided in a plate shape. In addition, the plurality of main roof rail members 60 may be coupled to a lower surface of the roof panel (not shown).

The plurality of main roof rail members 60 are substantially connected to the ring reinforcement member 40 and the front pillar 11 and the rear pillar 13 of each of the both side structures 10.

The plurality of main roof rail members 60 may be connected to respective corner portions 49 of the ring reinforcement member 40 on an extension line of the front pillar 11 and the rear pillar 13 of each of the both side structures 10.

Furthermore, the plurality of main roof rail members 60 may be radially connected to respective corner portions 49 of the ring reinforcement member 40 and respective front pillars 11 and rear pillars 13 of the both side structures 10.

Specifically, the plurality of main roof rail members 60 may be connected (for example, bonded) to respective corner portions 49 of the ring reinforcement member 40 and to both end portions of each of the front roof rail 20 and the rear roof rail 30.

Figure 4:
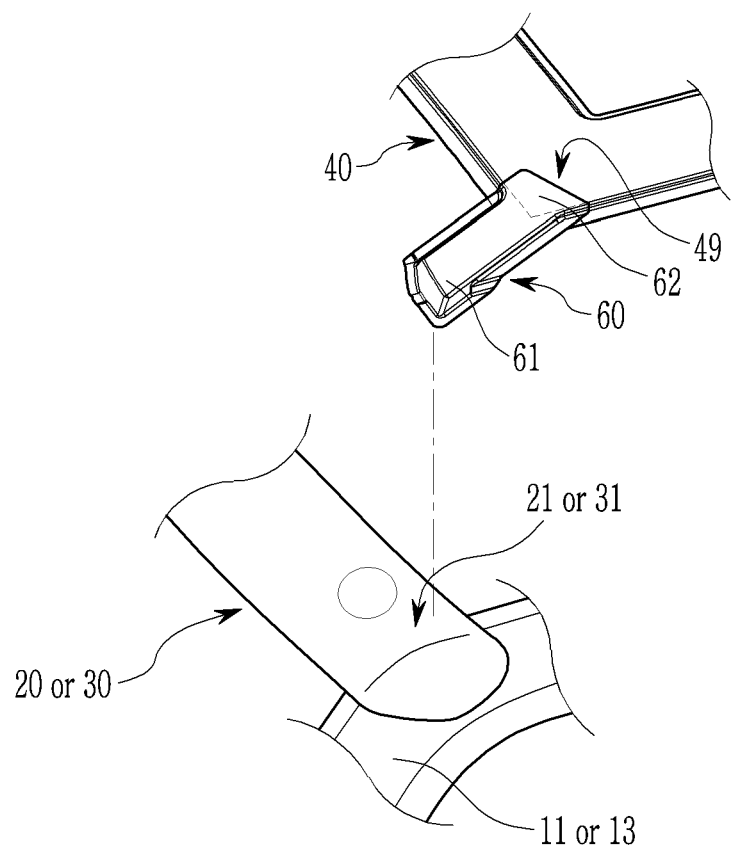
FIG. 4 illustrates a main roof member portion applied to a vehicle roof structure according to an embodiment of the present invention.

The plurality of main roof rail members 60 include a first bonding end portion 61 and a second bonding end portion 62 as shown in FIG. 4.

The first bonding end portion 61 may be bonded (for example, spot-welded) to pillar bonding end portions 21 and 31 of each of the front roof rail 20 and the rear roof rail 30. In addition, the second bonding end portion 62 may be bonded (for example, spot-welded) to each corner portion 49 of the ring reinforcement member 40.

Here, the first bonding end portion 61 and the second bonding end portion 62 may include bonding flanges integrally formed on end surfaces of the plurality of main roof rail members 60.

In an embodiment of the present invention, the plurality of sub-roof rail members 80 are configured to radially connect the both side structures 10 and the ring reinforcement member 40 together with the plurality of main roof rail members 60.

The plurality of sub-roof rail members 80 are connected to both side structures 10 and the ring reinforcement member 40 along the vehicle width direction.

In one example, the plurality of sub-roof rail members 80 may be connected to respective roof sides 15 of the both side structures 10 and the both side portions 43 of the ring reinforcement member 40 in the vehicle width direction.

Here, one of the plurality of sub-roof rail members 80 may be connected to the roof side 15 of one side structure 10 and one side portion 43 of the ring reinforcement member 40. In addition, the other one of the plurality of sub-roof rail members 80 may be connected to the roof side 15 of the other side structure 10 and the other side portion 43 of the ring reinforcement member 40.

Hereinafter, an operation of the vehicle roof structure 100 according to an embodiment of the present invention configured as described above will be described in detail with reference to FIG. 1 to FIG. 4.

First, according to the vehicle roof structure 100 according to an embodiment of the present invention, the ring reinforcement member 40 is connected to respective front pillars 11 and rear pillars 13 of the both side structures 10 through the plurality of main roof rail members 60.

Here, the plurality of main roof rail members 60 are connected to respective corner portions 49 of the ring reinforcement member 40 and to respective front pillars 11 and rear pillars 13 of the both side structures 10, through the front roof rail 20 and the rear roof rail 30.

In addition, according to the vehicle roof structure 100 according to an embodiment of the present invention, the plurality of sub-roof rail members 80 are connected to respective roof sides 15 of the both side structures 10 and to the both side portions 43 of the ring reinforcement member 40 in the vehicle width direction.

Accordingly, according to the vehicle roof structure 100 according to an embodiment of the present invention, the plurality of main roof rail members 60 and the plurality of sub-roof rail members 80 may radially connect the both side structures 10 and the ring reinforcement member 40.

Accordingly, according to the vehicle roof structure 100 according to an embodiment of the present invention, as the large-area roof glass is mounted on the ring reinforcement member 40, the PBV may provide the user with a sense of openness of the interior space through the large-area roof glass.

The vehicle roof structure 100 according to an embodiment of the present invention as described so far may transmit the load applied from the front and rear of the both side structures 10 to the ring reinforcement member 40 through the front pillar 11, the rear pillar 13, and the plurality of main roof rail members 60.

In addition, the vehicle roof structure 100 according to an embodiment of the present invention may transmit the load transmitted to the ring reinforcement member 40 to the at least one door supporting pillar 17 through the plurality of sub-roof rail members 80 and the roof sides 15 of the both side structures 10.

Accordingly, the vehicle roof structure 100 according to an embodiment of the present invention may have overall connection robustness (for example, stiffness or strength), frame rigidity, durability, impact absorption, and NVH performance of the vehicle body 1 configured in a one-box design.

Figure 5:
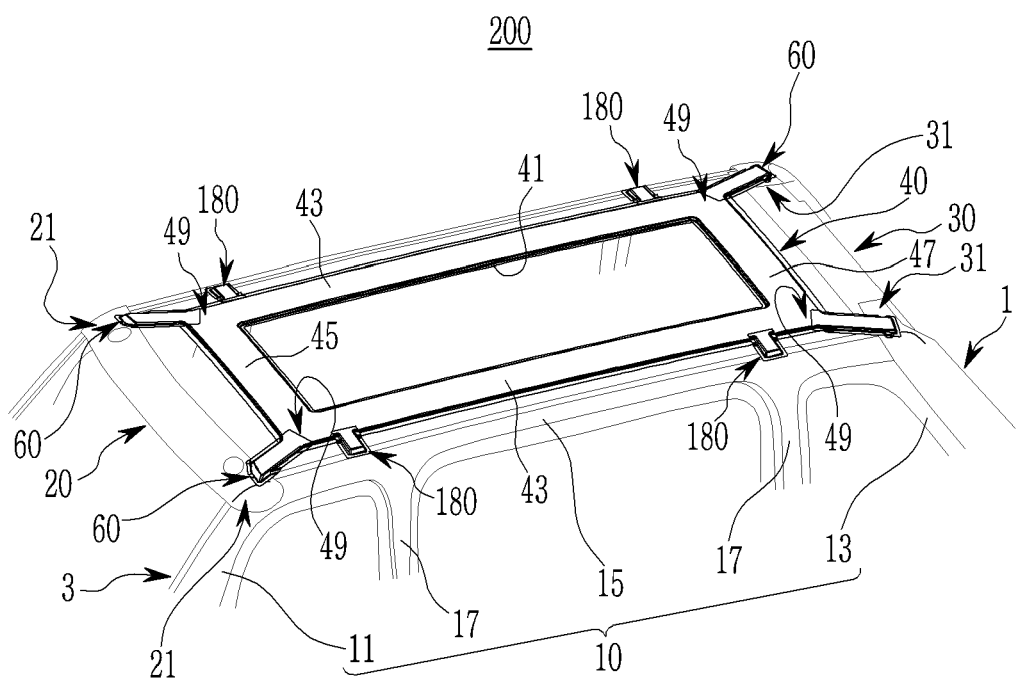
FIG. 5 illustrates a combined perspective view of a vehicle roof structure according to another embodiment of the present invention.
Figure 6:
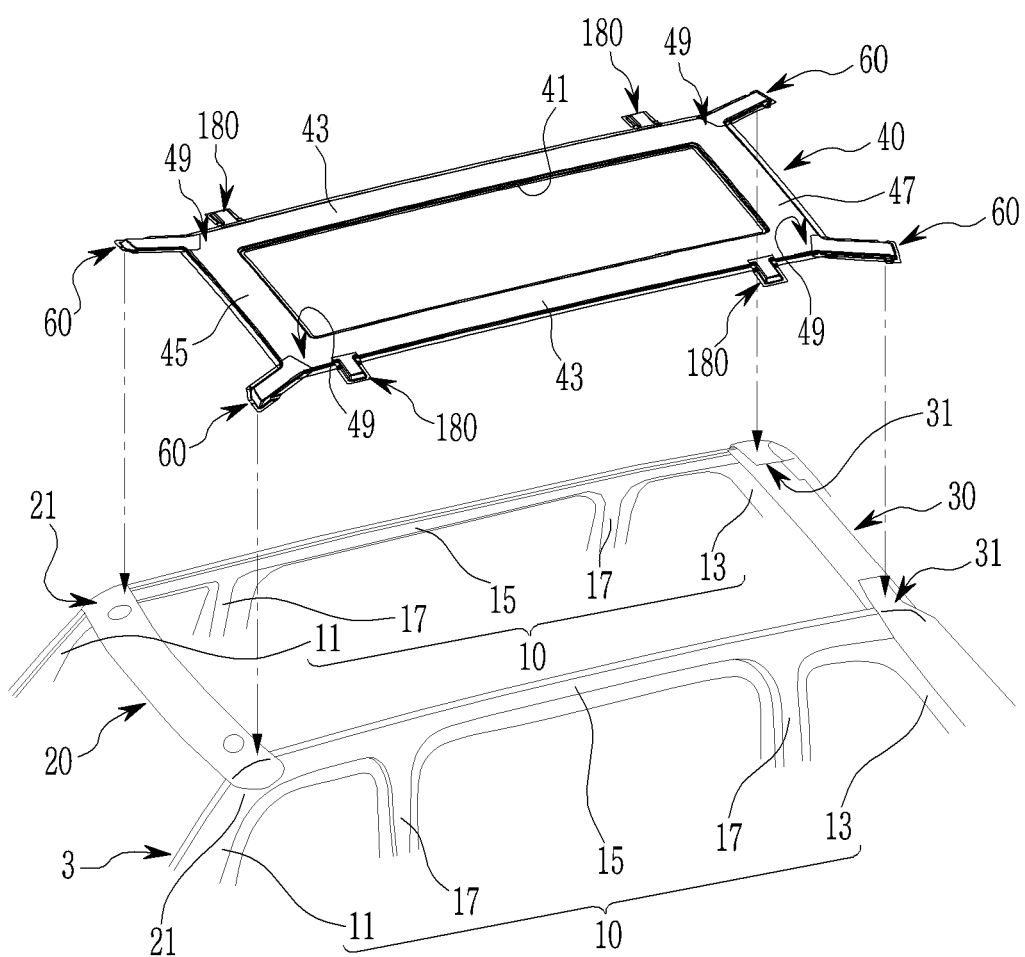
FIG. 6 illustrates an exploded perspective view of a vehicle roof structure according to another embodiment of the present invention.
Figure 7:
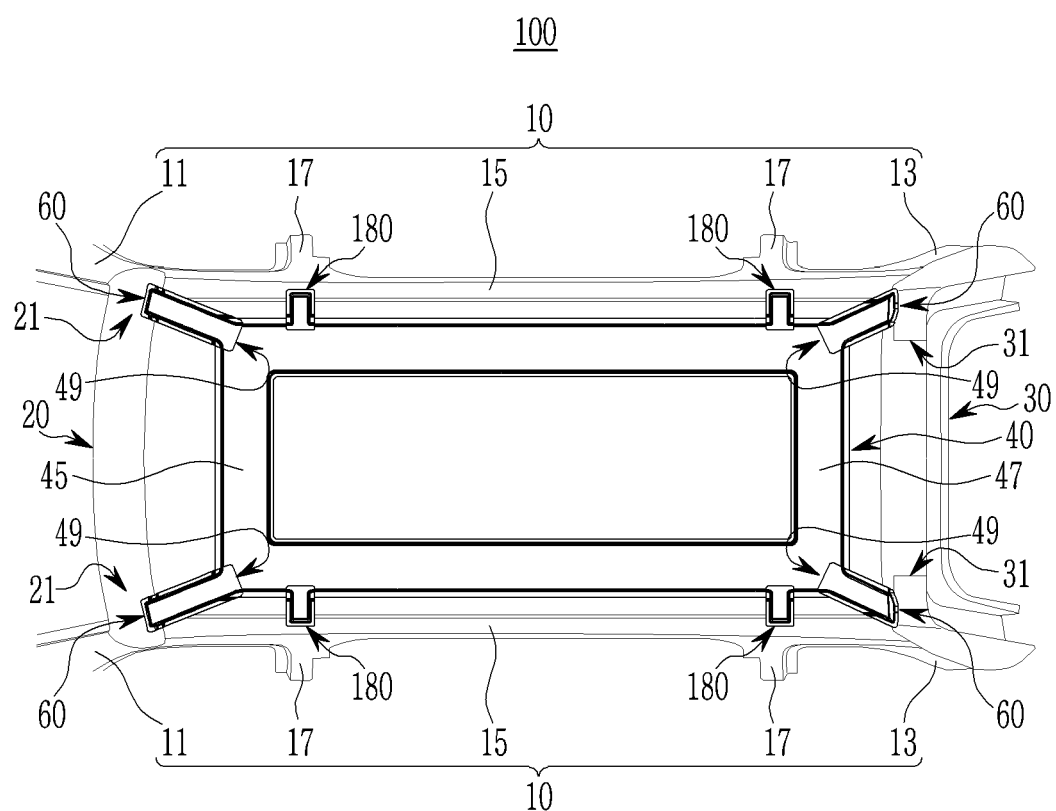
FIG. 7 illustrates a plan schematic diagram of a vehicle roof structure according to another embodiment of the present invention.

FIG. 5 illustrates a combined perspective view of a vehicle roof structure according to another embodiment of the present invention, FIG. 6 illustrates an exploded perspective view of a vehicle roof structure according to another embodiment of the present invention, and FIG. 7 illustrates a plan schematic diagram of a vehicle roof structure according to another embodiment of the present invention. In the drawings, the same reference numerals are assigned to the same components as in the previous embodiment.

Referring to FIG. 5 to FIG. 7, a vehicle roof structure 200 according to another embodiment of the present invention may include at least one door supporting pillar 17 of the both side structures 10, and a plurality of sub-roof rail members 180 connected to the both side portions 43 of the ring reinforcement member 40 in the vehicle width direction.

In the vehicle roof structure 200 according to another embodiment of the present invention, a plurality of main roof rail members 60 are the same as in the previous embodiment, so a detailed description thereof will be omitted.

Here, the at least one door supporting pillar 17 may be provided in a pair on each of the both side structures 10.

In another embodiment of the present invention, one pair of the plurality of sub-roof rail members 180 may be connected to a pair of door supporting pillars 17 of one side structure 10 and one side portion 43 of the ring reinforcement member 40. In addition, the other pair of the plurality of sub-roof rail members 180 may be connected to a pair of door supporting pillars 17 of the other side structure 10 and the other side portion 43 of the ring reinforcement member 40.

Accordingly, the vehicle roof structure 200 according to another embodiment of the present invention may transmit the load applied from the front and rear of the both side structures 10 to the ring reinforcement member 40 through the front pillar 11, the rear pillar 13, and the plurality of main roof rail members 60.

In addition, the vehicle roof structure 200 according to another embodiment of the present invention may directly transmit the load transmitted to the ring reinforcement member 40 to the at least one door supporting pillar 17 through the plurality of sub-roof rail members 180.

The remaining configuration and effect of the vehicle roof structure 200 according to another embodiment of the present invention as described above are the same as the previous embodiment, so a detailed description thereof will be omitted.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A vehicle roof structure mountable on side structures respectively provided at both sides of a vehicle body along a vehicle width direction, the vehicle roof structure comprising:
   a ring reinforcement member disposed between the side structures;
   a plurality of main roof rail members connected to the ring reinforcement member and connected to respective front pillars and rear pillars of the side structures; and
   a front roof rail and a rear roof rail connected in the vehicle width direction to upper portions of the respective front pillars and rear pillars of the side structures,
   wherein the plurality of main roof rail members include a first bonding end portion bonded to pillar bonding end portions of the front roof rail and the rear roof rail and a second bonding end portion bonded to respective corner portions of the ring reinforcement member.

2. The vehicle roof structure of claim 1, wherein the plurality of main roof rail members are connected to respective corner portions of the ring reinforcement member on an extension line of respective front pillars and rear pillars of the side structures.

3. The vehicle roof structure of claim 1, wherein the plurality of main roof rail members radially connect respective corner portions of the ring reinforcement member and the respective front pillars and rear pillars of the side structures.

4. The vehicle roof structure of claim 1, further comprising a plurality of sub-roof rail members connected to the side structures and the ring reinforcement member along the vehicle width direction.

5. The vehicle roof structure of claim 4, wherein the plurality of sub-roof rail members are connected to respective roof sides of the side structures and to both side portions of the ring reinforcement member along the vehicle width direction of the ring reinforcement member in the vehicle width direction.

6. The vehicle roof structure of claim 4, wherein the plurality of sub-roof rail members are connected to door supporting pillars respectively provided in the side structures and to both side portions of the ring reinforcement member along the vehicle width direction of the ring reinforcement member in the vehicle width direction.

7. The vehicle roof structure of claim 1, wherein the plurality of main roof rail members are connected to respective corner portions of the ring reinforcement member and both end portions of the front roof rail and the rear roof rail.

8. A vehicle roof structure mountable on side structures respectively provided at both sides of a vehicle body along a vehicle width direction, the vehicle roof structure comprising:
 a ring reinforcement member disposed between the side structures;
 a plurality of main roof rail members connected to the ring reinforcement member and connected to respective front pillars and rear pillars of the side structures, wherein the plurality of main roof rail members are connected to respective corner portions of the ring reinforcement member on an extension line of the respective front pillars and rear pillars of the side structures;
 a plurality of sub-roof rail members connected to the side structures and the ring reinforcement member along the vehicle width direction; and
 a front roof rail and a rear roof rail extending in the vehicle width direction and connected to upper portions of the respective front pillars and rear pillars of the side structures, wherein the plurality of main roof rail members include a first bonding end portion bonded to pillar bonding end portions of the front roof rail and the rear roof rail and a second bonding end portion bonded to respective corner portions of the ring reinforcement member.

9. The vehicle roof structure of claim 8, wherein the plurality of main roof rail members radially connect the respective corner portions of the ring reinforcement member and the respective front pillars and rear pillars of the side structures.

10. The vehicle roof structure of claim 8, wherein the plurality of sub-roof rail members are connected to respective roof sides of the side structures and to both side portions of the ring reinforcement member along the vehicle width direction of the ring reinforcement member in the vehicle width direction.

11. The vehicle roof structure of claim 8, wherein the plurality of sub-roof rail members are connected to door supporting pillars respectively provided in the side structures and to both side portions of the ring reinforcement member along the vehicle width direction of the ring reinforcement member in the vehicle width direction.

12. The vehicle roof structure of claim 8, wherein the plurality of main roof rail members are connected to the respective corner portions of the ring reinforcement member and both end portions of the front roof rail and the rear roof rail.

13. A vehicle comprising:
 a vehicle body, side structures respectively provided at both sides of the vehicle body along a vehicle width direction;
 a roof structure mounted on the side structures, the roof structure comprising:
  a ring reinforcement member disposed between the side structures; and
  a plurality of main roof rail members connected to the ring reinforcement member and connected to respective front pillars and rear pillars of the side structures; and
 a front roof rail and a rear roof rail connected in the vehicle width direction to upper portions of the respective front pillars and rear pillars of the side structures, wherein the plurality of main roof rail members include a first bonding end portion bonded to pillar bonding end portions of the front roof rail and the rear roof rail and a second bonding end portion bonded to respective corner portions of the ring reinforcement member.

14. The vehicle of claim 13, wherein the plurality of main roof rail members are connected to respective corner portions of the ring reinforcement member on an extension line of respective front pillars and rear pillars of the side structures.

15. The vehicle of claim 13, wherein the plurality of main roof rail members radially connect respective corner portions of the ring reinforcement member and the respective front pillars and rear pillars of the side structures.

16. The vehicle of claim 13, further comprising a plurality of sub-roof rail members connected to the side structures and the ring reinforcement member along the vehicle width direction.

17. The vehicle of claim 16, wherein the plurality of sub-roof rail members are connected to respective roof sides of the side structures and to both side portions of the ring reinforcement member along the vehicle width direction of the ring reinforcement member in the vehicle width direction.

18. The vehicle of claim 16, wherein the plurality of sub-roof rail members are connected to door supporting pillars respectively provided in the side structures and to both side portions of the ring reinforcement member along the vehicle width direction of the ring reinforcement member in the vehicle width direction.

19. The vehicle of claim 13, wherein the plurality of main roof rail members are connected to respective corner portions of the ring reinforcement member and both end portions of the front roof rail and the rear roof rail.

\* \* \* \* \*